Feb. 1, 1938.   C. R. PATON   2,106,874
MOTOR VEHICLE
Filed Nov. 21, 1934   2 Sheets-Sheet 1
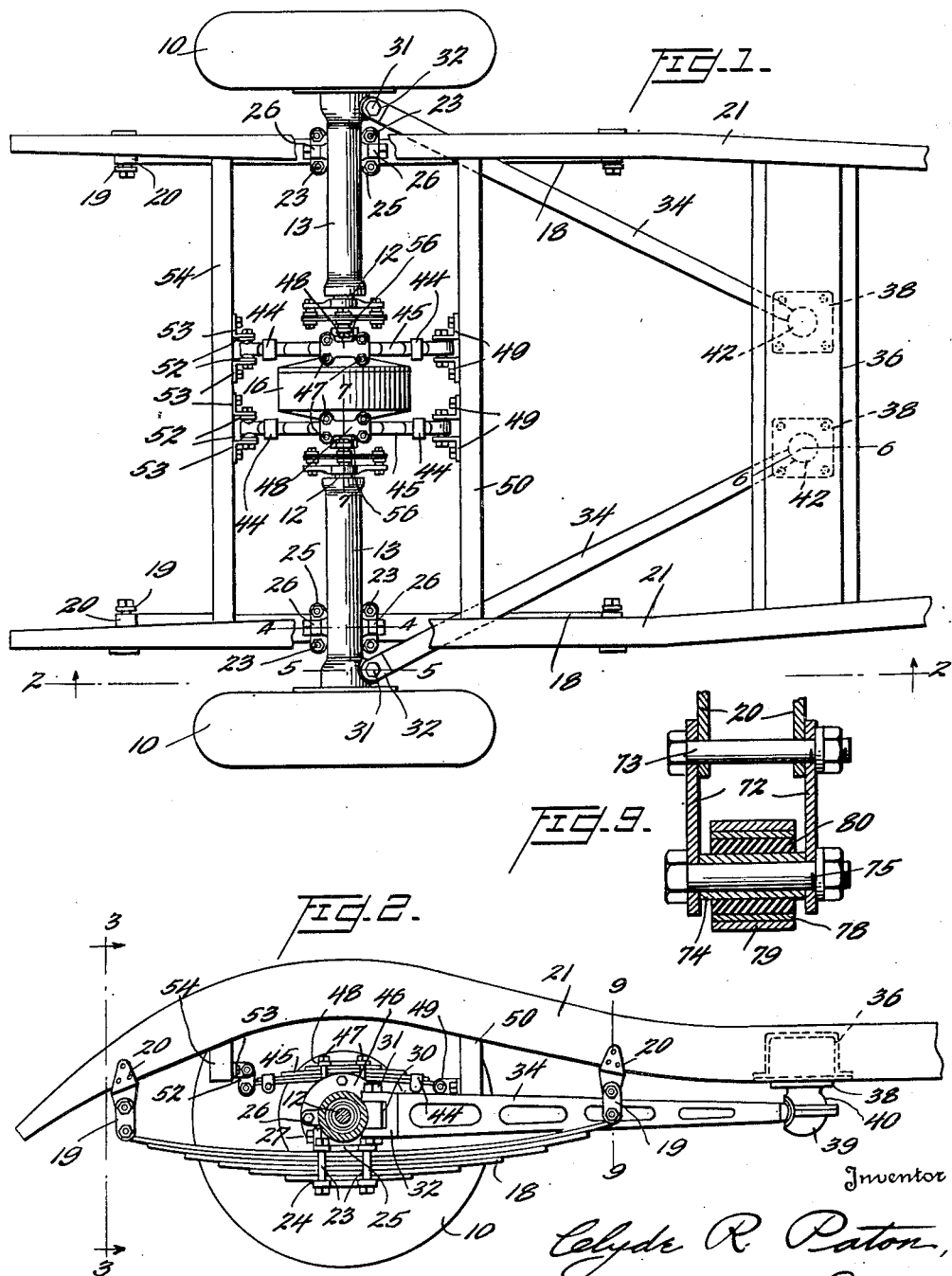

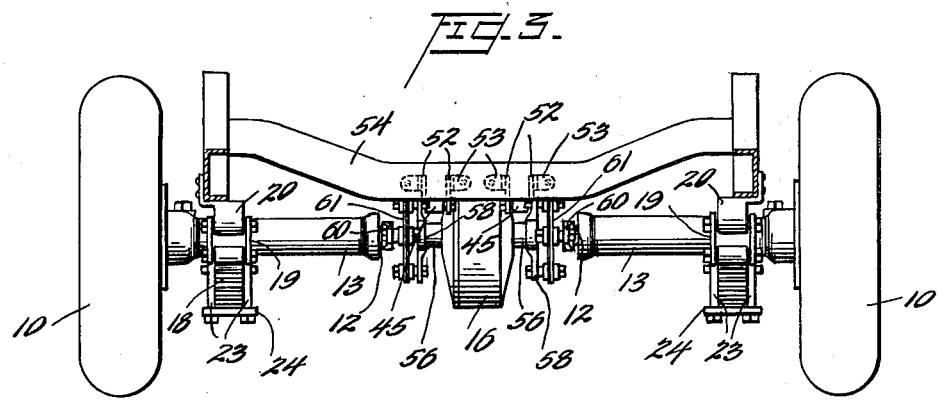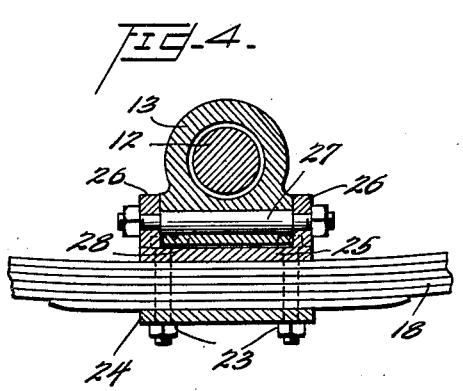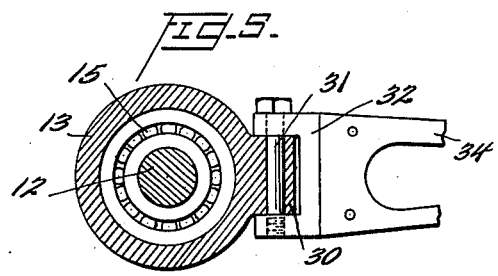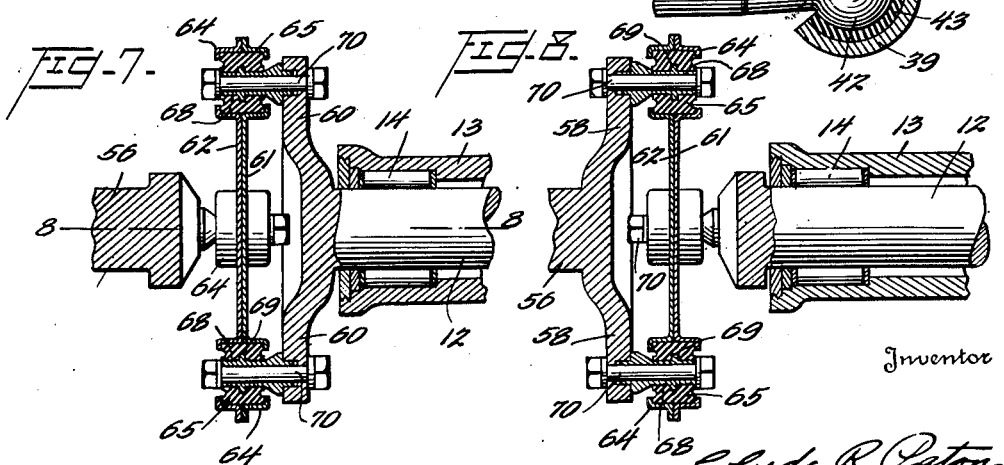

Patented Feb. 1, 1938

2,106,874

UNITED STATES PATENT OFFICE

2,106,874

MOTOR VEHICLE

Clyde R. Paton, Birmingham, Mich., assignor to Packard Motor Car Company, Detroit, Mich., a corporation of Michigan Application November 21, 1934, Serial No. 754,147

12 Claims. (Cl. 180—73)

This invention relates to motor vehicles and is more particularly concerned with motor vehicle wheel suspension systems. It is the principal object of the invention to provide a wheel suspension system applicable to the driving road wheels of the vehicle which will permit the maximum freedom of movement of the road wheels during operation of the vehicle and which will reduce to a minimum the development of noise and the transmission to the vehicle frame of vibrational disturbances and road shock.

The invention is directed particularly to the so-called independent type of wheel suspension in which the rising and falling movements of oppositely disposed road wheels are independently executed, as distinguished from the more conventional rigid axle type of wheel suspension. The invention contemplates the provision of a novel arrangement for suspending the usual differential gear housing from the vehicle frame so as to permit the housing to partake of oscillatory movement independently of the frame and independently of the road wheels.

It is a further feature of the invention that the driving torque applied to the differential housing is wholly absorbed by the housing suspension means, the arrangement being such that the yielding means employed to support the road wheels for rising and falling movement with respect to the frame is substantially unaffected by this driving torque.

It is a more specific object of the invention to provide an independent suspension for the driving road wheels of the vehicle including a differential gear housing independently supported on the vehicle frame by one or more leaf spring assemblies, the latter being preferably connected to the frame through rubber, the movement of the leaf spring assemblies being damped to an extent sufficient to ensure complete absorption of shock and vibration, and the road wheels being supported on separate longitudinally extending leaf spring assemblies which are likewise connected to the vehicle frame through rubber.

It is a further object of the invention to provide a wheel suspension system for the driving road wheels of the vehicle in which each driving axle extends from the road wheel assembly to a point closely adjacent the usual differential gear housing and is connected to the gearing within the latter by means of a single universal joint of such nature as to permit both angular and axial displacement of the axle in a vertical transverse plane.

Further objects and features of the invention will be apparent from the following description, taken in connection with the accompanying drawings, in which Figure 1 is a view in plan of a portion of a vehicle chassis illustrating one embodiment of the invention;

Figure 2 is a sectional view taken substantially on the line 2—2 of Figure 1;

Figure 3 is a sectional view taken substantially on the line 3—3 of Figure 2;

Figures 4, 5, and 6 are sectional views illustrating details and taken substantially on the lines 4—4, 5—5, and 6—6 respectively of Figure 1;

Figure 7 is a sectional view taken on the line 7—7 of Figure 1;

Figure 8 is a sectional view taken on the line 8—8 of Figure 7; and

Figure 9 is a section on the line 9—9 of Figure 2.

In order to facilitate an understanding of the invention, reference is made herein to the embodiment of the invention shown in the accompanying drawings and specific language is employed to describe the same. It will nevertheless be understood that no restriction of the scope of the invention is thereby intended, various modifications and alterations of the illustrated structure being contemplated.

For convenience in describing the invention, the driving road wheels of the vehicle will be assumed to be the rear road wheels; it will be appreciated, however, that the invention is equally applicable to a front wheel drive and that some features of the suspension may be applied to vehicle road wheels which are not employed for driving purposes.

In Figures 1 to 3 of the drawings the rear driving wheels are indicated at 10, each of these wheels being connected in conventional manner with an axle 12 which extends through an axle housing 13. Each axle is journalled within the associated axle housing, the bearing adjacent the inner end of the axle being indicated at 14 in Figures 7 and 8, and the bearing adjacent the outer end being indicated in Figure 5 at 15. At its outer end each axle housing is connected with the wheel assembly in the conventional manner, carrying for instance the usual brake backing plate and other non-rotating elements of the wheel assembly. In other words, the construction thus far described is wholly conventional except that separate axles and axle housings are associated with each road wheel, terminating short of the differential gear housing 16 which is disposed generally centrally of the vehicle frame.

Each axle housing 13 is yieldingly supported on the vehicle frame, preferably by means of a longitudinally extending leaf spring assembly 18. The leaf spring assembly may be supported at either end by shackles 19 secured to brackets 20 carried by the side rail 21 of the vehicle frame, the spring assembly being thus permitted a limited movement fore and aft of the vehicle frame. The connection between each axle housing 13 and the associated spring assembly 18 may comprise the usual spring attaching bolts 23, a lower plate 24, and an upper plate 25, the latter being provided with upstanding lugs 26 which are apertured to receive a bolt 27 passing through a corresponding aperture in a boss 29 formed on the lower side of the axle housing. It will be observed that in this manner the axle housing is pivotally connected to the spring assembly on an axis extending generally longitudinally of the vehicle, free rocking of the axle housing and axle in a vertical transverse plane being permitted without any twisting of the spring assembly.

Each axle housing is further provided with a boss 30 at the forward side thereof which is apertured to receive a bolt 31, the latter extending through corresponding apertures in a yoke-shaped portion 32 constituting the rearward end of a torque arm 34, pivotal connection on a generally vertical axis between the torque arm 34 and the axle housing 13 being thus effected. Each torque arm 34 extends forwardly and inwardly of the vehicle frame and is supported on a transverse frame member 36 by means of a bracket indicated generally at 38 and comprising complementary generally hemispherical socket portions 39 and 40 which are secured together. The forward end of each torque arm 34 is formed to provide a generally spherical head portion 42, the latter being received in the bracket 38. As shown more particularly in Figure 6 of the drawings, a sheath of rubber or similar resilient vibration absorbing material 43 is interposed between and preferably vulcanized or otherwise surface bonded to the socket portions 39 and 40 of the bracket 38 and the head 42 of the torque arm.

It will be observed that the movement of which the outer end of each axle housing 13 partakes is prescribed by the positions assumed by the associated leaf spring assembly 18 and the rearward end of the associated torque arm 34 during rising and falling movement of the road wheel, the necessary change in the angular position of the torque arm 34 being permitted by distortion of the rubber sheath 43 which serves at the same time to damp vibration and reduce the transmission of road shock and other disturbances to the frame. As the road wheel rises and falls, the associated leaf spring assembly will partake of slight fore and aft movement which is permitted by the spring shackles 19 as hereinbefore pointed out. The axle housing 13 will likewise rock about its point of pivotal connection with the associated leaf spring assembly on the axis of the bolt 27.

The differential housing 16 is supported yieldingly on the frame and for this purpose may be carried by one or more longitudinally extending leaf spring assemblies 45. Preferably one such spring assembly is disposed at each side of the differential housing and is secured to a laterally and upwardly extending boss 46 formed at tne side of the housing by means of spring attaching bolts 47 and plate 48. At one end, for instance at the forward end, each leaf spring assembly 45 is pivotally secured to a bracket 49 which is carried by a cross frame member 50. At the opposite end, each leaf spring assembly 45 is connected through a shackle 52 to a bracket 53 secured to a cross frame member 54. By means of this construction the spring assemblies 45 are permitted to flex, and the differential housing 16 may thus partake of rising and falling oscillatory movement in both transverse and longitudinal planes with respect to the vehicle frame. Each spring assembly 45 is provided with one or more clips 44 which clamp the leaves of the assembly together to appreciably increase the friction exerted therebetween when the spring is flexed.

It will be understood that the differential gear housing encloses the usual gearing, this gearing being omitted from the drawings to simplify the illustration, only the stub shafts 56 projecting from either side of the housing and driven by the gearing in the conventional manner being shown. Interposed between the shafts 56 and the axles 12 are universal joints, these joints being preferably constructed as shown in Figures 7 and 8 to provide for relative angular as well as slight bodily displacement of the axles 12 and the shafts 56 in a transverse generally vertical plane. Thus each universal joint may comprise outwardly directed arms 58 formed integrally with or secured to the associated shaft 56, and similar arms 60 secured to or formed integrally with the associated axle 12, alternate arms 58 and 60 being disposed at intervals of substantially 90°. A generally annular member formed of plates 61 and 62 secured in face to face contact is interposed between the arms 58 and the arms 60, the plates 61 and 62 being formed at intervals of 90° to provide generally cup-shaped portions 64 receiving therein blocks 65 of rubber or other deformable material of a similar nature. A bushing 68 extends through each of the rubber blocks and is preferably provided with a circumferential rib portion 69 lying within the block, the rubber blocks being vulcanized or otherwise surface bonded within the cup-shaped receptacles 64 and to the bushing 68. Each bushing 68 is in turn secured to one of the arms 58 or 60 by means of a bolt 70 passed through the bushing and the associated arm.

Universal joints of this character are conventional and the details thereof form no part of the present invention except as employed in combination with other elements of the suspension. It will be appreciated, however, that these joints afford the necessary axial relative movement between each axle 12 and the associated shaft 56, the use of an extensible axle formed of telescoping parts being thereby eliminated, together with the noise and roughness of action inherent in the employment of sectional axles.

Each of the leaf springs 45 and 18 are connected to the vehicle frame through rubber to prevent the transmission of noise and vibrational disturbances to the frame. For convenience, only one such connection has been illustrated, this being shown in Figure 9. Here the links 72 which constitute the shackle connection of the spring 18 to the frame are pivoted to the bracket 20 by means of a bolt 73 and a bushing 74 is pivoted to the links at the opposite ends thereof by means of a bolt 75. A bushing 78 is secured within the spring eye 79 at the end of the spring assembly and a sheath of rubber 80 is interposed between and vulcanized to the bushings 74 and 78. It will of course be appreciated that the rubber connection may be employed at the upper end rather than the lower end of the shackle and it will also be understood that where the shackle is omitted, and a simple pivoted connection between the spring and frame is employed, as at one end of the leaf spring assemblies 45, the links 72 will be omitted without otherwise changing the construction.

With this arrangement the differential housing 16 is supported solely by the leaf spring assemblies 45, there being no connection between the differential housing and the axle housings 13 other than that afforded by the universal joint connections between the shafts 56 and the respective axles 12. Since the interleaf friction of the springs 45 is materially increased by the clips 44, the action of these springs assisted by the rubber connection of the springs to the frame serves to effectively damp all disturbances.

A wheel suspension of this character is particularly desirable where a driving system such as the well-known Hotchkiss drive is employed in which the motor and the gearing within the differential housing are connected by a relatively long drive shaft having universal joints at either end. As the rear wheels rise and fall with respect to the frame, these universal joints are flexed with the result that a slight rotative movement is applied to the drive shaft and undesirable oscillation is set up which, in the present instance, can be absorbed by slight rocking movement of the differential housing. Again, clutch chatter which is the result of sudden application of torque on engagement of the clutch is readily absorbed by rocking of the differential housing and resultant damping of this rocking movement by the leaf springs 45 which afford the support for the housing. Thus the arrangement provides a highly flexible drive system which nevertheless prevents by effective damping the building up of vibrational disturbances to undesirable proportions.

Having thus described the invention, what is claimed as new and desired to be secured by Letters Patent is:

1. In a motor vehicle, the combination with a vehicle frame, of driving road wheels disposed at opposite sides of said frame, and means yieldingly supporting said road wheels for independent rising and falling movement with respect to the frame, said means comprising a differential gear housing disposed generally centrally of the frame and having gearing therein, at least one longitudinally extending leaf spring assembly acting between said frame and said housing to yieldingly support the latter, driving axles carrying said road wheels, said axles extending laterally of said differential housing and having universal joint connections with the gearing therein, and longitudinally extending leaf spring assemblies supporting said axles on said frame adjacent each road wheel.

2. In a motor vehicle, the combination with a vehicle frame, of driving road wheels disposed at opposite sides of said frame, and means yieldingly supporting said road wheels for independent rising and falling movement with respect to the frame, said means comprising a differential gear housing disposed generally centrally of the frame and having gearing therein, at least one longitudinally extending leaf spring assembly acting between said frame and said housing to yieldingly support the latter, driving axles carrying said road wheels, said axles extending laterally of said differential housing and having universal joint connections with the gearing therein, longitudinally extending leaf spring assemblies supporting said axles on said frame adjacent each road wheel, and torque arms, one connected with each axle adjacent the associated road wheel and extending away from the axle and inwardly of the frame, each arm being pivotally connected to the frame for swinging movement about an axis coinciding substantially with the axis of the universal joint connection about which the associated axle swings when the road wheel rises and falls.

3. In a motor vehicle, the combination with a vehicle frame, of driving road wheels disposed at opposite sides of said frame, and means yieldingly supporting said road wheels for independent rising and falling movement with respect to the frame, said means comprising a differential gear housing disposed generally centrally of the frame and having gearing therein, at least one longitudinally extending leaf spring assembly acting between said frame and said housing to yieldingly support the latter, driving axles carrying said road wheels, said axles extending laterally of said differential housing and having universal joint connections with the gearing therein, the members of each of said universal joint connections partaking of relative movement axially of the associated axle during rising and falling movement of the wheel, and longitudinally extending leaf spring assemblies supporting said axles on said frame adjacent each road wheel.

4. In a motor vehicle, the combination with a vehicle frame, of driving road wheels disposed at opposite sides of said frame, and means yieldingly supporting said road wheels for independent rising and falling movement with respect to the frame, said means comprising a differential gear housing disposed generally centrally of the frame and having gearing therein, means supporting said housing on the frame, driving axles carrying said road wheels, said axles extending laterally of said differential housing and having universal joint connections with the gearing therein, and longitudinally extending leaf spring assemblies supporting said axles on said frame adjacent each road wheel, said axles partaking of limited lateral bodily displacement under control of said leaf spring assemblies during rising and falling movement of said road wheels, said universal joint connections each including members connected for concurrent rotation and for relative angular and lateral displacement in a generally vertical plane transverse to the vehicle frame.

5. In a motor vehicle, the combination with a vehicle frame, of driving road wheels disposed at opposite sides of said frame, and means yieldingly supporting said road wheels for independent rising and falling movement with respect to the frame, said means comprising a differential gear housing disposed generally centrally of the frame and having gearing therein, means supporting said housing on the frame, driving axles carrying said road wheels, said axles extending laterally of said differential housing and having universal joint connections with the gearing therein, and longitudinally extending leaf spring assemblies supporting said axles on said frame adjacent each road wheel, said axles partaking of limited lateral bodily displacement under control of said leaf spring assemblies during rising and falling movement of said road wheels, said universal joint connections each including members connected by means including rubber for concurrent rotation and for relative angular and lateral displacement in a generally vertical plane transverse to the vehicle frame.

6. In a motor vehicle, the combination with a vehicle frame, of driving road wheels disposed at opposite sides of said frame, axles supporting said road wheels, longitudinally extending leaf spring assemblies supported on said frame adjacent said road wheels for limited bodily movement fore and aft of the frame and for flexure, pivotal connections between said axles and spring assemblies on axes extending generally longitudinally of the frame, and torque arms acting between said frame and said axles and connected with the latter for lateral and rising and falling swinging movement.

7. In a motor vehicle, the combination with a vehicle frame, of a differential housing yieldingly supported on said frame and having differential gearing therein, axles extending laterally of said differential housing, road wheels carried by said axles, each axle having a single universal joint connection with the gearing in said housing, said connections affording the sole support for said axles at the inner ends thereof, and means including torque arms yieldingly supporting said axles adjacent the outer ends thereof on the frame for rising and falling movement in arcuate paths about said universal joint connections.

8. In a motor vehicle, the combination with a vehicle frame, of a differential housing yieldingly supported on said frame and having differential gearing therein, axles extending laterally of said differential housing, road wheels carried by said axles, each axle having a single universal joint connection with the gearing in said housing, said connections affording the sole support for said axles at the inner ends thereof, and means yieldingly supporting said axles adjacent the outer ends thereof on the frame for rising and falling movement, said means comprising longitudinally extending leaf spring assemblies carried by said frame and pivotally connected with the respective axles on axes directed generally longitudinally of the frame.

9. In a motor vehicle, the combination with a vehicle frame, of a differential housing yieldingly supported on said frame and having differential gearing therein, axles extending laterally of said differential housing, road wheels carried by said axles, each axle having a single universal joint connection with the gearing in said housing, said connections affording the sole support for said axles at the inner ends thereof, means yieldingly supporting said axles adjacent the outer ends thereof on the frame for rising and falling movement, said means comprising longitudinally extending leaf spring assemblies carried by said frame and pivotally connected with the respective axles on axes directed generally longitudinally of the frame, each spring assembly being shackled to said frame at each end thereof for bodily longitudinal displacement, and torque arms acting between said axles and said frame and pivoted to the latter on axes coinciding substantially with the axes of the associated universal joint connections.

10. In a motor vehicle, the combination with a vehicle frame, of a differential gear housing having gearing therein, axles driven by said gearing, means supporting and guiding the outer ends of said axles on said frame for rising and falling movement independently of said differential housing, and leaf spring means acting between said frame and said housing and affording the sole support for said housing on said frame.

11. In a motor vehicle, the combination with a vehicle frame, of a differential gear housing having gearing therein, axles driven by said gearing and supported on said frame for rising and falling movement independently of said differential housing, and leaf spring means acting between said frame and said housing and affording the sole support for said housing on said frame, said leaf spring means comprising a pair of longitudinally extending leaf spring assemblies connected with said frame through rubber.

12. In a motor vehicle, the combination with a vehicle frame, of driving road wheels disposed at opposite sides of said frame, and means yieldingly supporting said road wheels for independent rising and falling movement with respect to the frame, said means comprising a differential gear housing disposed generally centrally of the frame and having gearing therein, at least one longitudinally extending leaf spring assembly acting between said frame and said housing to yieldingly support the latter, driving axles carrying said road wheels, said axles extending laterally of said differential housing and having universal joint connections with the gearing therein, longitudinally extending leaf spring assemblies supporting said axles on said frame adjacent each road wheel, torque arms, one connected with each axle adjacent the associated road wheel and extending away from the axle and inwardly of the frame, each arm being pivotally connected to the frame for swinging movement about an axis coinciding substantially with the axis of the universal joint connection about which the associated axle swings when the road wheel rises and falls, and vibration absorbing means including rubber interposed between said frame and said torque arms and between said frame and each of said leaf spring assemblies.

CLYDE R. PATON.